(12) United States Patent
Shao et al.

(10) Patent No.: US 9,610,858 B2
(45) Date of Patent: Apr. 4, 2017

(54) THREE-PHASE INVERTER CONTROL FOR ELECTRIFIED VEHICLES

(71) Applicants: Baiming Shao, Rochester Hills, MI (US); Bing Cheng, West Bloomfield, MI (US)

(72) Inventors: Baiming Shao, Rochester Hills, MI (US); Bing Cheng, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 319 days.

(21) Appl. No.: 13/952,870

(22) Filed: Jul. 29, 2013

(65) Prior Publication Data

US 2015/0032311 A1 Jan. 29, 2015

(51) Int. Cl.
| | |
|---|---|
| *H02P 6/08* | (2016.01) |
| *H02P 6/14* | (2016.01) |
| *B60L 15/02* | (2006.01) |
| *B60L 11/14* | (2006.01) |
| *H02M 7/5387* | (2007.01) |

(52) U.S. Cl.
CPC ............. *B60L 15/025* (2013.01); *B60L 11/14* (2013.01); *H02M 7/53871* (2013.01); *B60L 2240/421* (2013.01); *B60L 2240/423* (2013.01); *B60L 2240/427* (2013.01); *B60L 2240/443* (2013.01); *B60L 2240/526* (2013.01); *B60L 2240/527* (2013.01); *B60L 2240/529* (2013.01); *B60L 2240/547* (2013.01); *H02M 2007/53876* (2013.01); *Y02T 10/643* (2013.01); *Y02T 10/70* (2013.01); *Y02T 10/7077* (2013.01); *Y10S 903/906* (2013.01)

(58) Field of Classification Search
CPC .. H02P 6/08; H02P 6/14; B60L 15/025; Y10S 903/906
USPC ............................................. 701/22; 903/906
See application file for complete search history.

(56) References Cited

U.S. PATENT DOCUMENTS

| | | | | |
|---|---|---|---|---|
| 5,998,959 | A | * | 12/1999 | Eisenhardt .................... 318/802 |
| 6,137,704 | A | * | 10/2000 | Ito et al. ........................ 363/132 |
| 7,629,764 | B2 | | 12/2009 | Shoemaker et al. |
| 2003/0163296 | A1 | * | 8/2003 | Richards ......................... 703/14 |
| 2006/0192522 | A1 | * | 8/2006 | Kerkman et al. ............. 318/812 |
| 2007/0069673 | A1 | * | 3/2007 | Oyobe et al. ................. 318/376 |

(Continued)

OTHER PUBLICATIONS

Valentine, R., "Motor Control Electronics Handbook," Chapter 8: AC Induction Motor Control, pp. 242-265 (May 1998).

*Primary Examiner* — Jerrah Edwards
*Assistant Examiner* — Majdi Alsomiri
(74) *Attorney, Agent, or Firm* — Ralph E. Smith

(57) ABSTRACT

Techniques are presented for more efficient three-phase inverter control for electrified vehicles (EVs). The techniques can be executed by a controller of an EV that includes one or more processors. Specifically, the techniques include closed-loop discontinuous pulse-width modulation (DPWM) control of a three-phase inverter based on electric motor current feedback. The three-phase inverter control techniques can be further based on electric motor/rotor position feedback. Based on the feedback, the techniques can select one of a plurality of zero-voltage vectors in real-time. The selected zero-voltage vector can be used when generating duty cycles for switching of the three-phase inverter, which can result in decreased switching losses and increased efficiency of the three-phase inverter.

20 Claims, 8 Drawing Sheets

(56) References Cited

U.S. PATENT DOCUMENTS

2008/0272717 A1* 11/2008 Gleason et al. ............... 318/139
2010/0134058 A1* 6/2010 Nagashima et al. ..... 318/400.23
2010/0320945 A1* 12/2010 Taniguchi et al. ....... 318/400.02
2011/0012544 A1* 1/2011 Schulz et al. ............ 318/400.02
2011/0050141 A1* 3/2011 Yeh et al. ................... 318/434
2011/0062904 A1* 3/2011 Egami ...................... 318/400.04
2013/0147264 A1* 6/2013 Taddeo ......................... 307/9.1

* cited by examiner

THREE-PHASE INVERTER CONTROL FOR ELECTRIFIED VEHICLES

FIELD

The present disclosure relates generally to electrified vehicles and, more particularly, to three-phase inverter control for electrified vehicles.

BACKGROUND

An electrified vehicle (EV) is a vehicle that can be propelled using electric power, i.e., an electric current. Examples of EVs include plug-in hybrid EVs (PHEVs), fuel cell electric vehicles (FCEVs), and battery electric vehicles (BEVs). The electric current can power an electric motor, which generates drive torque to propel the EV. The electric motor can be a three-phase electric motor that is powered by three-phase alternating currents (AC). The EV can include a battery system that provides a direct current (DC), which can be converted to the three-phase AC by a three-phase inverter.

SUMMARY

In one form, a method is provided in accordance with the teachings of the present disclosure. The method includes determining, at a controller of an electrified vehicle (EV), the controller including one or more processors, three-phase AC currents at an electric motor of the EV, wherein the EV includes a three-phase inverter configured to convert a direct current (DC) from a battery system of the EV to the three-phase AC currents for the electric motor of the EV. The method includes determining, at the controller, a rotational position of the electric motor. The method includes determining, at the controller, an output voltage vector based on the three-phase AC currents, reference currents, and the rotational position of the electric motor, wherein the reference currents are based on a torque request for the electric motor, a speed of the electric motor, and a DC voltage output by the battery system. The method includes selecting, at the controller, one of two zero-voltage vectors for the three-phase inverter based on the output voltage vector. The method also includes controlling, by the controller, switching of the three-phase inverter using the zero-voltage vector.

In another form, a method is provided in accordance with the teachings of the present disclosure. The method includes determining, at a controller of an EV, the controller including one or more processors, three-phase AC currents at an electric motor of the EV, wherein the EV includes a three-phase inverter configured to convert a DC from a battery system of the EV to the three-phase AC currents for the electric motor of the EV. The method includes determining, at the controller, a rotational position of a rotor of the electric motor. The method includes converting, at the controller, the three-phase AC currents to a stationary reference frame to obtain stationary currents. The method includes converting, at the controller, the stationary currents to a synchronous reference frame based on the rotational position of the rotor of the electric motor to obtain synchronous currents. The method includes determining, at the controller, synchronous voltages based on the synchronous currents and reference currents using current regulators, wherein the reference currents are based on a torque request for the electric motor, a speed of the electric motor, and a DC voltage of the battery system. The method includes converting, at the controller, the synchronous voltages to the stationary reference frame based on the rotational position of the rotor of the electric motor to obtain stationary voltages. The method includes converting, at the controller, the stationary voltages from the stationary reference frame to three-phase AC output voltages. The method includes selecting, at the controller, one of two zero-voltage vectors for the three-phase inverter based on the three-phase AC output voltages. The method includes generating, at the controller, discontinuous pulse-width modulation (DPWM) duty cycles based on the three-phase AC output voltages, the three-phase AC currents, and the zero-voltage vector. The method also includes controlling, by the controller, switching of the three-phase inverter using the DPWM duty cycles.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As mentioned above, an electrified vehicle (EV) can include a three-phase inverter that converts direct current (DC) from a battery system into three-phase alternating currents (AC) (also referred to as "three-phase AC currents") to power a three-phase electric motor. The three-phase inverter can be commanded to generate a plurality of different voltage vectors. A voltage vector can refer to a vector representation of the voltages for the three different phases. One or more of these voltage vectors can be zero-voltage vectors, which represents zero voltage for each of the three phases.

One technique for controlling the three-phase inverter is discontinuous pulse-width modulation (DPWM), which can refer to not switching one phase per 120 electric degrees of the three-phase electric motor. DPWM control techniques, however, are typically open-loop and the zero-voltage vector(s) for each phase are predefined. Thus, the switching pattern does not change with different power factors and switching losses increase, which results in decreased efficiency of the three-phase inverter.

Accordingly, techniques are presented for more efficient three-phase inverter control for EVs. More specifically, the techniques are directed to DPWM closed-loop control of a three-phase inverter based on electric motor current feedback. The three-phase inverter control techniques can be further based on electric motor (rotor) position feedback and an output voltage vector. The techniques can select one of a plurality of zero-voltage vectors in real-time, which can result in decreased switching losses and increased efficiency of the three-phase inverter. While the techniques of the present disclosure are described with respect to EVs, it should be appreciated that these techniques could be applicable to three-phase inverters for other suitable devices, e.g., a generator.

Figure 1:
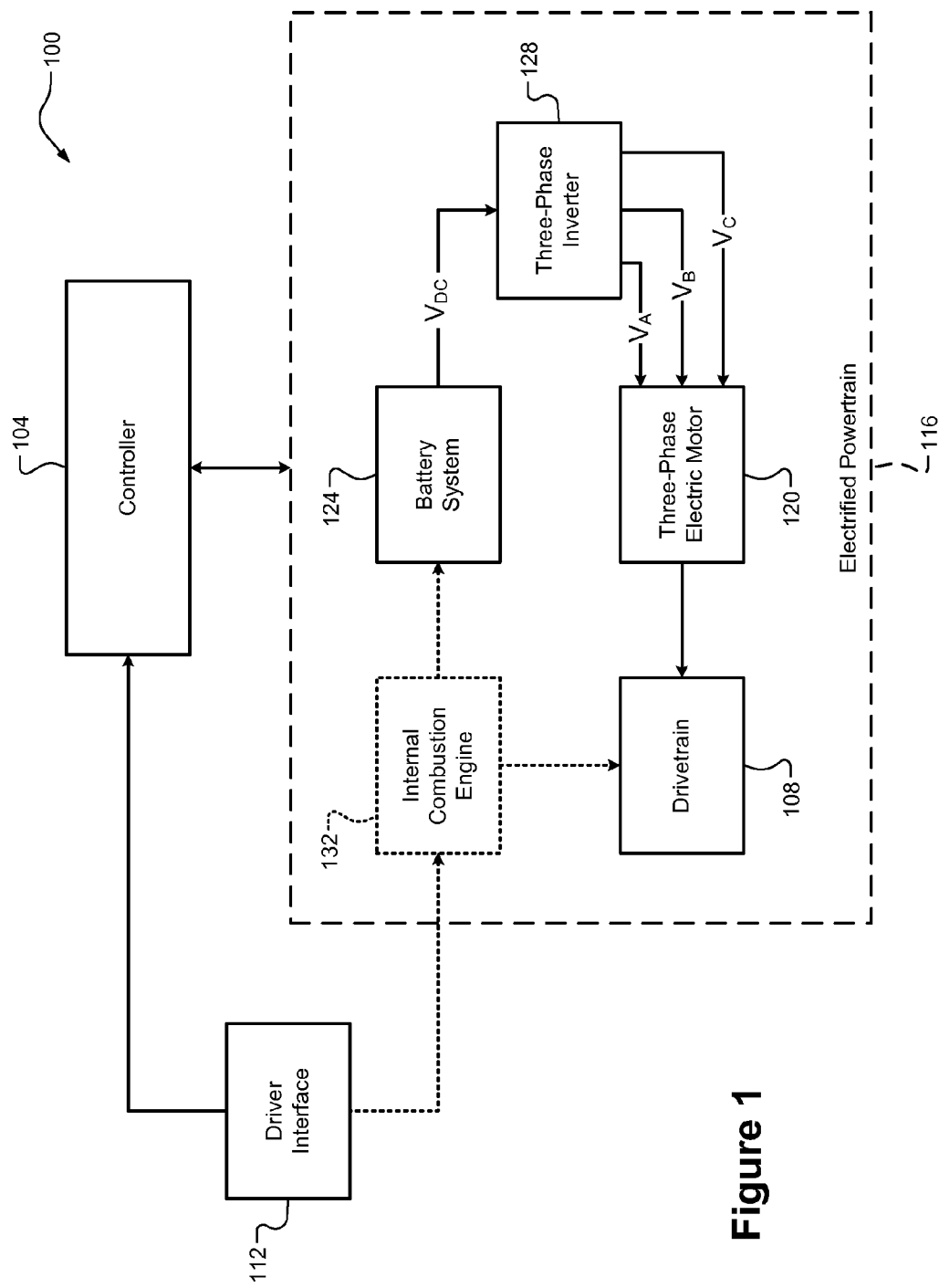
FIG. 1 is a functional block diagram of an electrified vehicle (EV) according to the principles of the present disclosure.

Referring now to FIG. 1, a functional block diagram of an exemplary EV 100 is illustrated. The EV 100 can include a controller 104, a drivetrain 108, a driver interface 112, and an electrified powertrain 116. As shown, the drivetrain 108 can be part of the electrified powertrain 116. Based on driver input via the driver interface 112, the controller 104 can determine a torque request. The controller 104 can then control the electrified powertrain 116 based on the torque request such that the electrified powertrain 116 outputs a desired drive torque to the drivetrain 108. The drivetrain 108 can include any suitable components for propelling the EV 100 (a transmission, a torque converter, four wheels, etc.). It should be appreciated that the components of the drivetrain 108 and the electrified powertrain 116 can be grouped in various different manners. The driver interface 112 can include any suitable components for interacting with a driver of the EV 100 (an accelerator pedal, a display, etc.).

The electrified powertrain 116 can include a three-phase electric motor 120, a battery system 124, and a three-phase inverter 128. The battery system 120 can be any suitable battery system configured to output a DC voltage ($V_{DC}$) for the three-phase inverter 128. In some implementations, the EV 100 can further include an internal combustion engine 132. The internal combustion engine 132 may be configured to generate drive torque for the drivetrain 108, e.g., based on the torque request, and/or to recharge the battery system 124, e.g., via a generator, and thus may be part of the electrified powertrain 116.

The three-phase inverter 128 can convert the DC voltage $V_{DC}$ to three-phase AC voltages ($V_A$, $V_B$, $V_C$) for powering the three-phase electric motor 120, which can generate the drive torque for the drivetrain 108. The three-phase inverter 128 can also be described as converting a DC ($I_{DC}$) from the battery system 124 to three-phase AC currents ($I_A$, $I_B$, $I_C$) for powering a load, i.e., the three-phase electric motor 120. The three-phase inverter 128 can also generate power to charge the battery system 124 and thereby recover braking energy for the vehicle 100. The three-phase electric motor 120 can be any suitable induction or asynchronous AC motor in which current is induced in a rotor by a magnetic field of a stator.

Figure 2A:
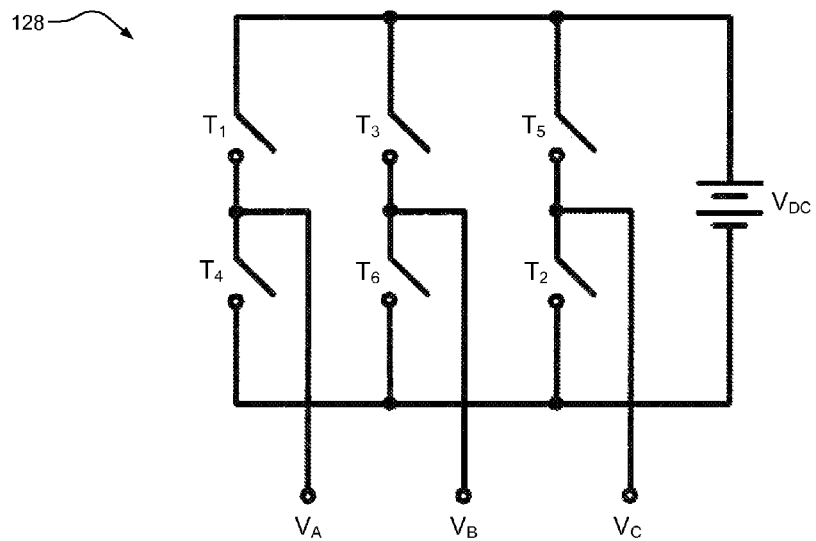
FIGS. 2A-2B are circuit diagrams illustrating switching patterns of a three-phase inverter according to the principles of the present disclosure.
Figure 2B:
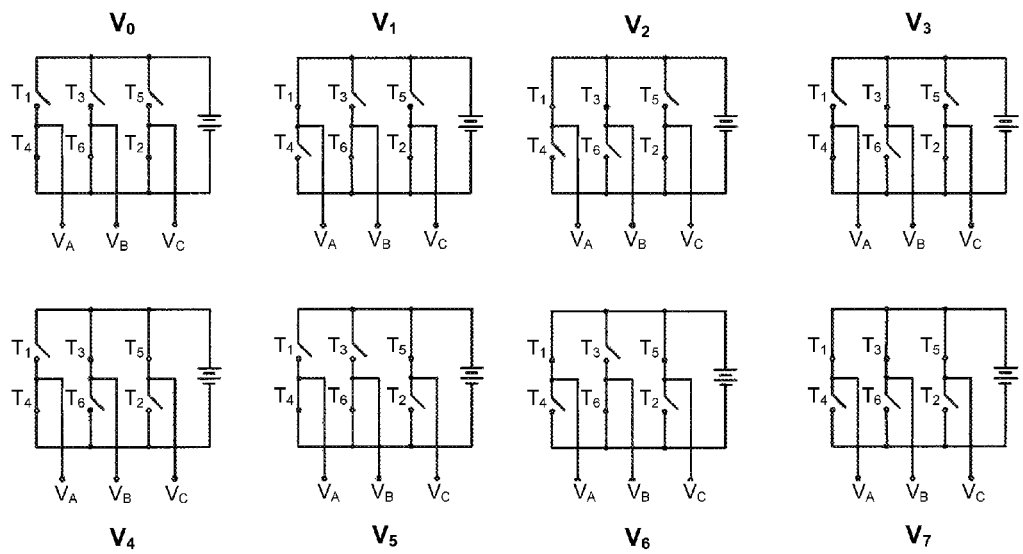

Referring now to FIGS. 2A-2B, an example of the three-phase inverter 128 is illustrated. This example configuration is also known as a three-phase full bridge inverter. As shown in FIG. 2A, the three-phase inverter 128 can include transistors $T_1$-$T_6$. The transistors $T_1$-$T_6$ can be any suitable type of transistor, such as an insulated-gate bipolar transistor (IGBT). By controlling a switching pattern of the transistors $T_1$-$T_6$, the three-phase inverter 128 can convert the DC voltage $V_{DC}$ of the battery system 124 into the three-phase AC voltages $V_A$, $V_B$, and $V_C$.

FIG. 2B illustrates the various switching patterns for the three-phase inverter 128. Each of these eight different switching patterns for the transistors $T_1$-$T_6$ produces a different voltage vector $V_0$-$V_7$. The voltage vector refers to the voltages at outputs $V_A$-$V_C$ and thus can be represented as vector $V_X(V_A\ V_B\ V_C)$, where X is an index for the voltage vectors. For example, voltage vector $V_1$ can be represented as (100) because $V_A$ equals 1 ($V_{DC}$) but $V_B$ and $V_C$ each equal zero. The various switching patterns for the transistors $T_1$-$T_6$ and the corresponding voltage vectors are illustrated in Table 1 below.

TABLE 1

| $V_X$ | $V_A$ | $V_B$ | $V_C$ | $T_1$ | $T_2$ | $T_3$ | $T_4$ | $T_5$ | $T_6$ |
|---|---|---|---|---|---|---|---|---|---|
| $V_0$ | 0 | 0 | 0 | 0 | 1 | 0 | 1 | 0 | 1 |
| $V_1$ | 1 | 0 | 0 | 1 | 1 | 0 | 0 | 0 | 1 |
| $V_2$ | 1 | 1 | 0 | 1 | 1 | 1 | 0 | 0 | 0 |
| $V_3$ | 0 | 1 | 0 | 0 | 1 | 1 | 1 | 0 | 0 |
| $V_4$ | 0 | 1 | 1 | 0 | 0 | 1 | 1 | 1 | 0 |
| $V_5$ | 0 | 0 | 1 | 0 | 0 | 0 | 1 | 1 | 1 |
| $V_6$ | 1 | 0 | 1 | 1 | 0 | 0 | 0 | 1 | 1 |
| $V_7$ | 1 | 1 | 1 | 1 | 0 | 1 | 0 | 1 | 0 |

Figure 3A:
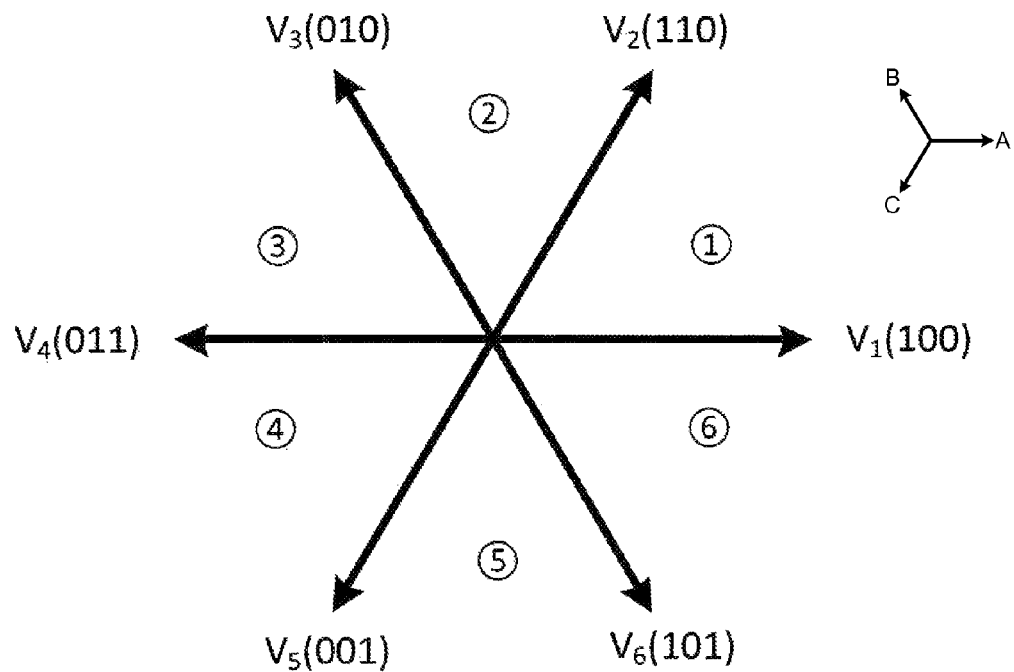
FIGS. 3A-3B are vector diagrams of various voltage vectors according to the principles of the present disclosure.

Referring now to FIG. 3A, the various voltage vectors $V_1$-$V_6$ are illustrated as vectors. Zero-voltage vectors $V_0$ and $V_7$ are not illustrated because their magnitudes are each zero. The voltage vectors $V_1$-$V_6$ are represented with respect to three axes indicative of the three phases A, B, and C, respectively, which is also illustrated in FIG. 3A. As shown, the voltage vectors $V_1$-$V_6$ divide the 360 degrees into six regions (1)-(6). Region (1) lies between voltage vectors $V_1$ and $V_2$, region (2) lies between voltage vectors $V_2$ and $V_3$, and so on.

Figure 3B:
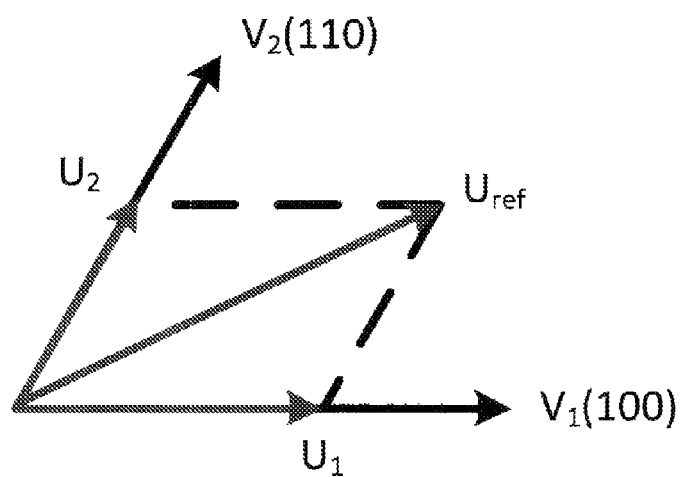

FIG. 3B illustrates a voltage command $U_{ref}$ located in region (1) between voltage vectors $V_1$ and $V_2$. For example, this voltage command $U_{ref}$ could be generated by the controller 104 based on driver input in order to produce a desired drive torque at the three-phase electric motor 120. As illustrated, this voltage command $U_{ref}$ can be generated using voltage vectors $V_1$ and $V_2$, provided the following space vector pulse-width modulation (SVPWM) theory equations are satisfied:

$$U_{ref}T = V_1 T_1 + V_2 T_2 + (T_0/2)V_0 + (T_0/2)V_7,\text{ and}$$

$$T = T_1 + T_2 + T_0,$$

where T is the PWM period, $T_1$ is the duration of voltage vector $V_1$, $T_2$ is the duration of voltage vector $V_2$, and $T_0$ is the duration time of zero-voltage vectors $V_0$ and $V_7$.

Figure 4:
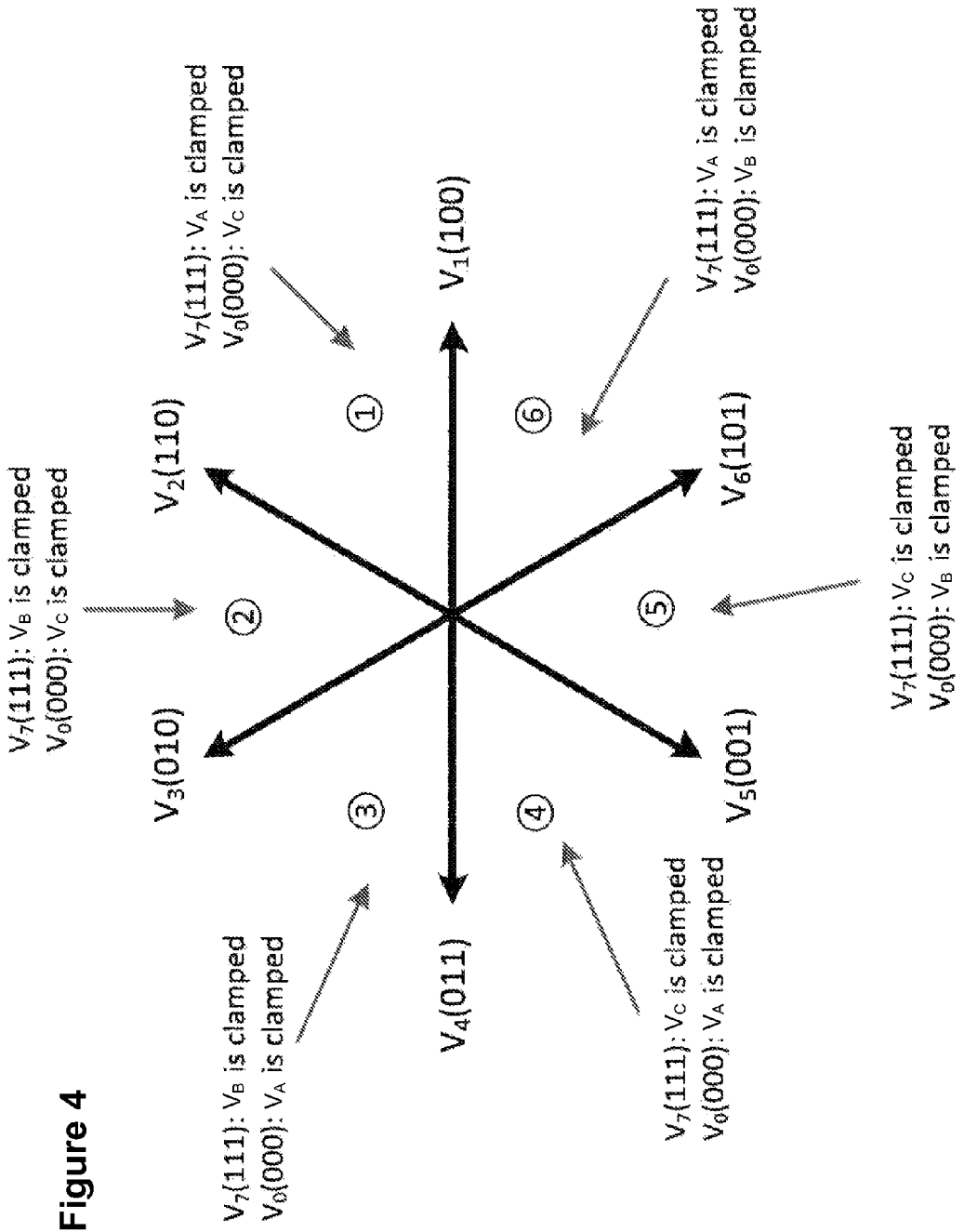
FIG. 4 is a diagram of various voltage vectors and operation of the three-phase inverter with respect to two different zero-voltage vectors according to the principles of the present disclosure.

FIG. 4 illustrates the available zero-voltage vectors with respect to each of the regions (1)-(6). Specifically, the result of the two different zero-voltage vectors $V_0$ and $V_7$ for each of the regions (1)-(6) is illustrated. The result is one of the three outputs $V_A$, $V_B$, and $V_C$ of the three-phase inverter 128 being clamped to either the positive terminal of the battery system 124 or to the negative terminal of the battery system 124. However, because the currents for the three-phase electric motor 120 are not exactly symmetric, e.g., due to power factor angle being non-zero, one of these zero-voltage vectors $V_0$ and $V_7$ may be preferable to further decrease switching losses and increase efficiency of the three-phase inverter 128.

In region (3), for example, utilizing zero-voltage vector $V_0$ causes $V_A$ to be clamped to the negative terminal of the battery system 124. On the other hand, utilizing zero-voltage vector $V_7$ causes $V_B$ to be clamped to the positive terminal of the battery system 124. In region (3), the magnitude, e.g., the root-mean-squared (RMS) value, of current $I_B$ is larger than that of current $I_A$, and therefore it is preferable to utilize $V_7$ in region (3) to further decrease switching losses and increase efficiency of the three-phase inverter 128. Only two phases can be considered in each of the regions (1)-(6) because one phase will be unaffected by the selection of the zero-voltage vector, e.g., phase C in region (3). Thus, by utilizing three-phase current feedback as discussed herein, the selection of the zero-voltage vector for each of the regions (1)-(6) can be optimized in real-time.

Figure 5:
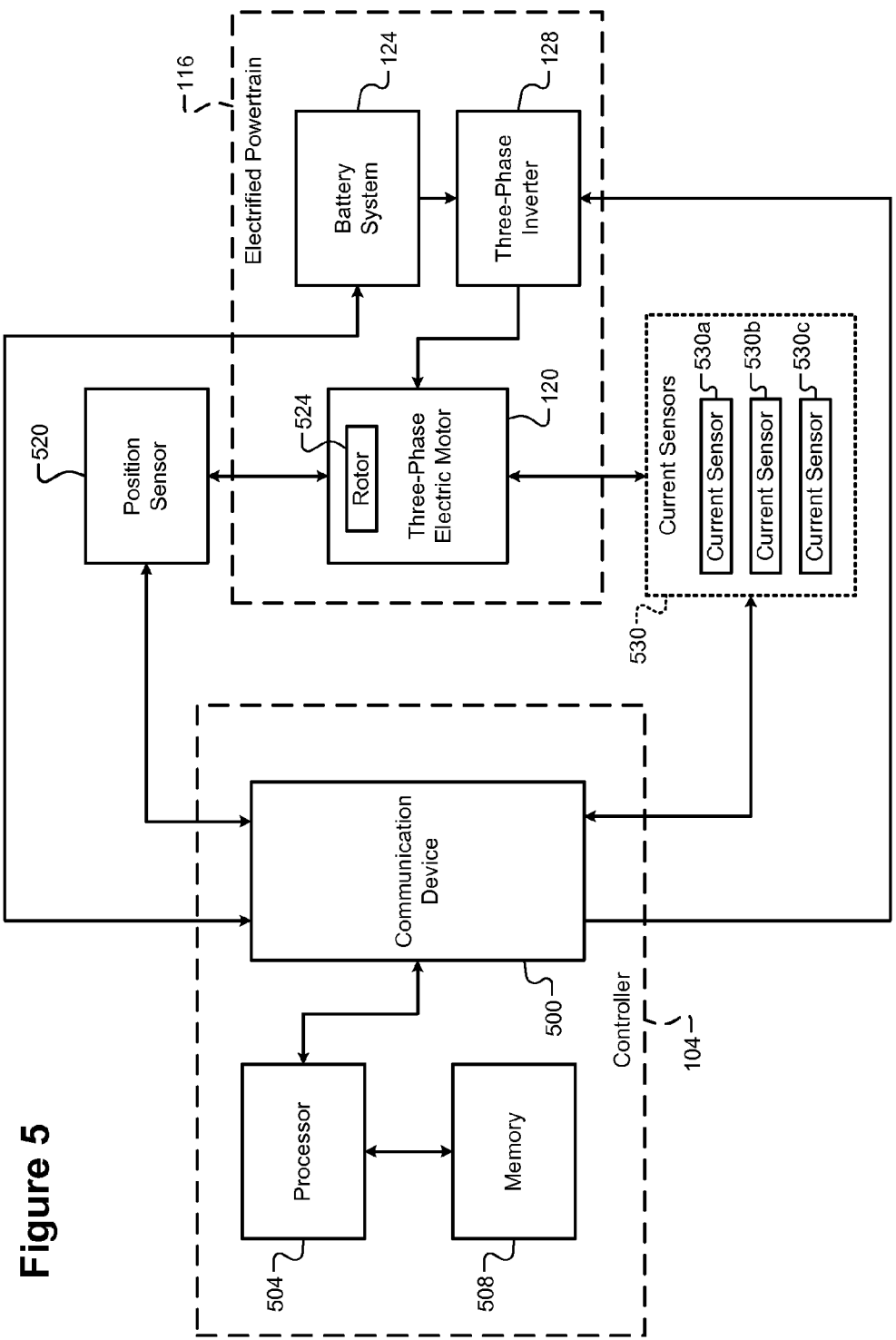
FIG. 5 is a functional block diagram of a controller of the EV according to the principles of the present disclosure.

FIG. 5 illustrates a functional block diagram of the controller 104. While the controller 104 is illustrated as being separate from the three-phase inverter 128, it should be appreciated that the aspects of the controller 104 for implementing the techniques of the present disclosure could be implemented as part of the three-phase inverter 128 or as part of another special motor controller. The controller 104 can include a communication device 500, a processor 504, and a memory 508. The controller 104 can also communicate with a position sensor 520 and three current sensors 530a, 530b, and 530c (collectively referred to as "current sensors 530"), which are associated with the three-phase electric motor 120. While the position sensor 520 and the current sensors 530 are illustrated as being standalone, it should be appreciated that one or more of these sensors could be implemented as part of the controller 104 or as part of the three-phase electric motor 120.

The communication device 500 can include any suitable components for communication, e.g., via a controller area network (CAN), with the various illustrated components: the position sensor 520, the current sensors 530, the three-phase electric motor 120, the battery system 124, and the three-phase inverter 128. Specifically, the communication device 500 can receive measurements from the position sensor 520 indicative of a rotational position of the three-phase electric motor 120, e.g., a rotor 524 of the three-phase electric motor 120, and measurements from the current sensors 530 indicative of the three-phase AC ($I_A$, $I_B$, and $I_C$) at the three-phase electric motor 120. The communication device 500 can also receive information from the battery system 124, e.g., a DC voltage, and information from the driver input device 112, e.g., a torque request. Further, the communication device 500 can send control signals indicative of duty cycles for switching of the transistors $T_1$-$T_6$ of the three-phase inverter 128.

The processor 504 can control operation of the controller 104. The processor 504 can perform functions including, but not limited to loading/executing an operating system of the controller 104, receiving information from and/or transmitting information to other components via the communication device 500, and/or controlling read/write operations at the memory 508. The memory 508 can be any suitable storage medium configured to store information at the controller 104 (flash, hard disk, etc.). It should be appreciated that the term "processor" as used herein can refer to both a single processor and two or more processors operating in a parallel or distributed architecture. Specifically, the processor 504 can implement all or a portion of the techniques described herein, which are described in more detail below.

Figure 6:
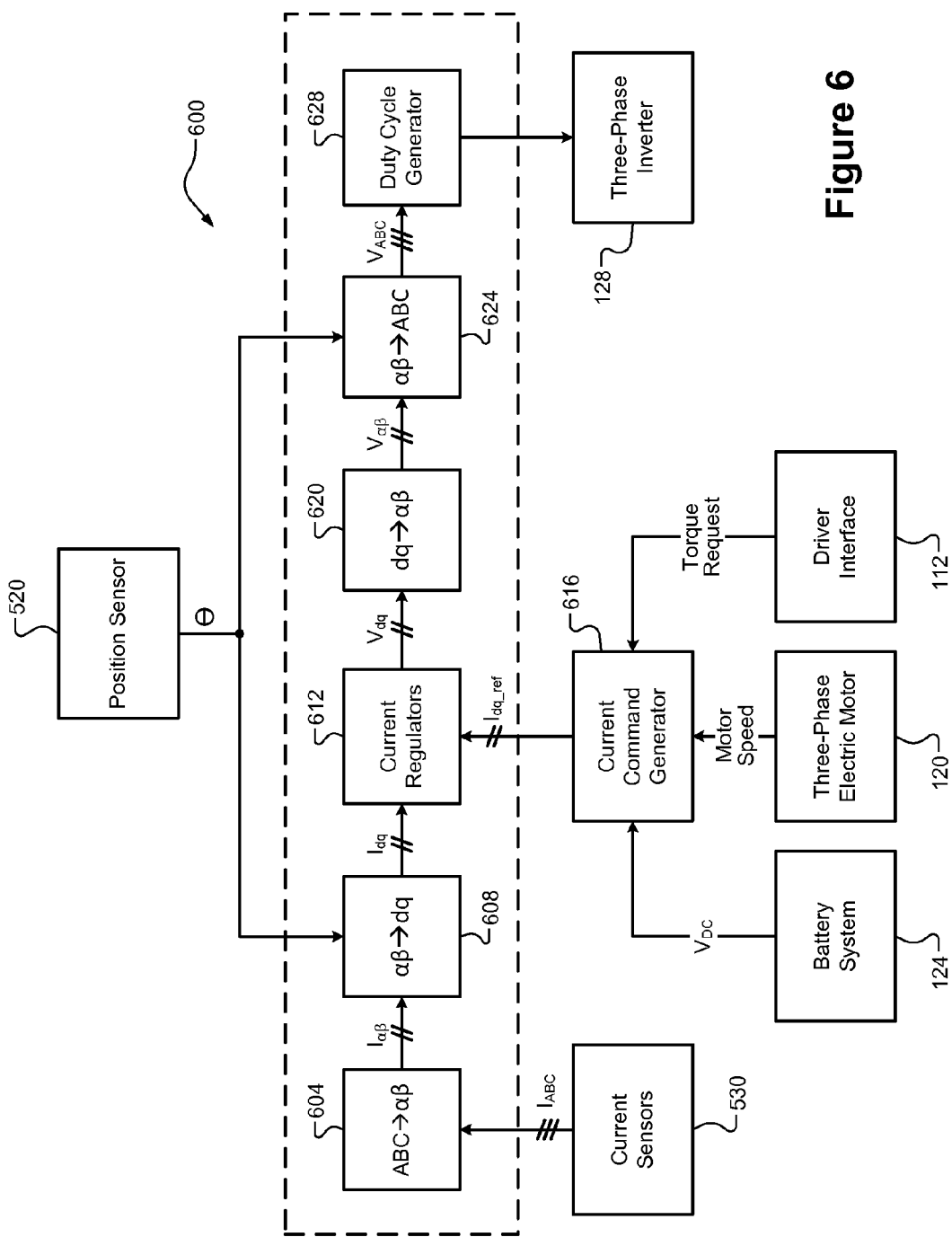
FIG. 6 is a functional block diagram of an architecture for operations executable by a processor of the controller according to the principles of the present disclosure.

FIG. 6 illustrates an example architecture 600 indicative of operations executable by the processor 504. The operations begin when the three-phase AC ($I_{ABC}$) is received as feedback from the current sensors 530. The three-phase AC $I_{ABC}$ represents three currents for the three phases, respectively: $I_A$, $I_B$, and $I_C$. A first transformation 604 converts the three-phase AC to stationary currents ($I_{\alpha\beta}$) in a stationary reference frame ($\alpha\beta$). The stationary currents $I_{\alpha\beta}$ represent two currents in the stationary reference frame: $I_\alpha$ and $I_\beta$. The parameters $\alpha$ and $\beta$ can be indicative of rotational speed and current magnitude of the three-phase electric motor 120 with respect to a stationary observer's reference.

A second transformation 608 converts the stationary currents to currents ($I_{dq}$) in a synchronous reference frame (dq) based on the rotational position ($\ominus$) received as feedback from the position sensor 520. This transformation 608 can also be referred to as a direct-quadrature transformation, or Clarke transformation. The synchronous currents $I_{dq}$ represent two currents in the synchronous reference frame: $I_d$ and $I_q$. The parameters d and q can also be indicative of torque current and magnetic field excitation current of the three-phase electric motor 120.

Current regulators 612 regulate the synchronous currents based on reference currents ($I_{dq\_ref}$). For example only, the current regulators 612 could include a proportional-integral (PI) controller. The reference currents can be generated by a current command generator 616 based on the torque request, a speed of the three-phase electric motor 120, and $V_{DC}$ from the battery system 124. A third transformation 620 (also a direct-quadrature transformation, e.g., an inverse direct-quadrature transformation) converts the synchronous voltages to stationary voltages ($V_{\alpha\beta}$) in the stationary reference frame based on the rotational position and the output voltage vector. A fourth transformation 624 (e.g., a two-to-three transformation that converts two phase signals—$\alpha$ and $\beta$—to three phase signals—A, B, and C) obtains three-phase AC voltages ($V_{ABC}$) from the stationary voltages. A duty cycle generator 628 then generates DPWM duty cycles for switching of the transistors $T_1$-$T_6$ of the three-phase inverter 128 based on the three-phase AC voltages. The operations can then be repeated.

Figure 7:
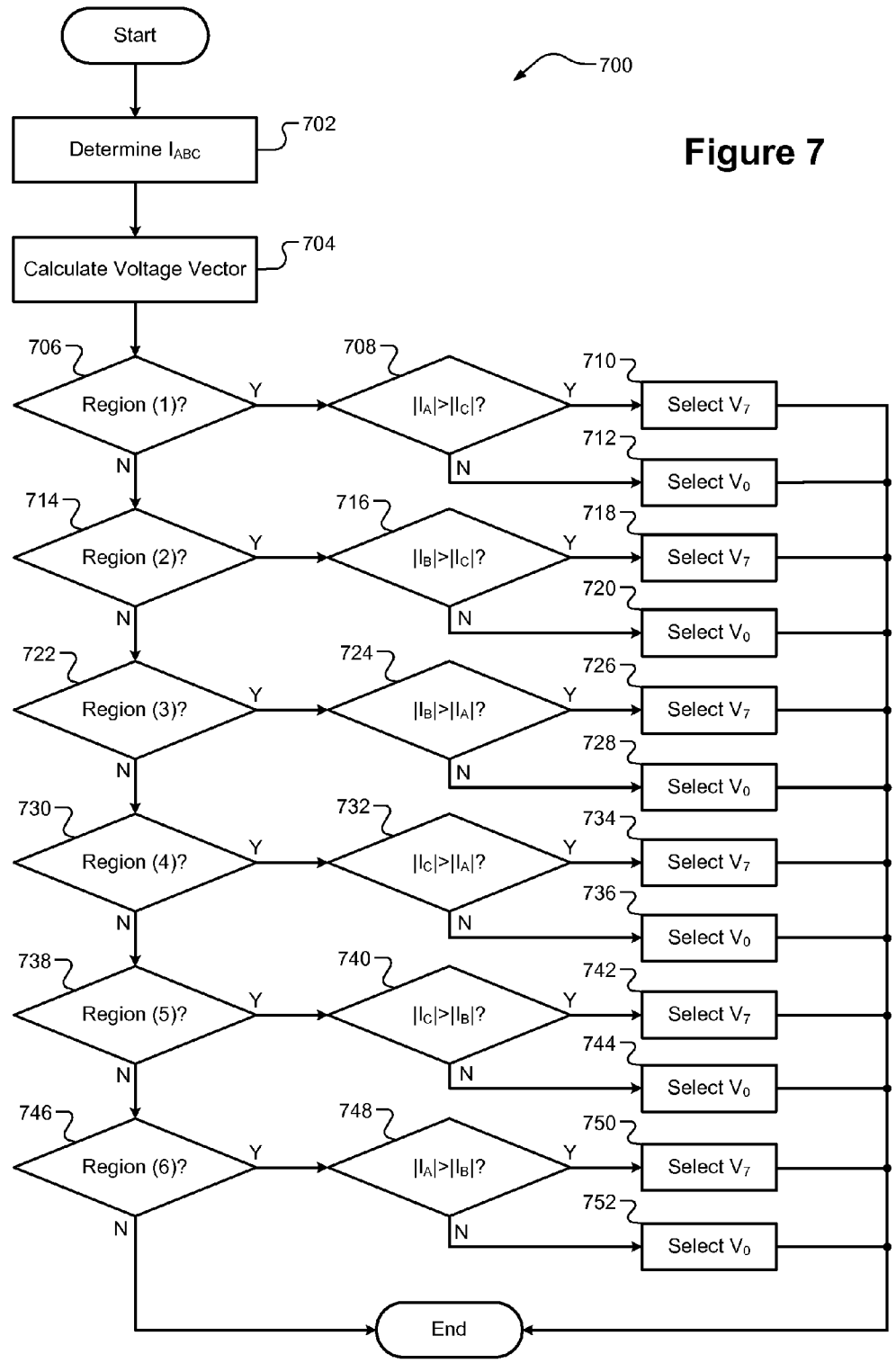
FIG. 7 is a flow diagram of a method of three-phase inverter control according to the principles of the present disclosure.

FIG. 7 is a flow diagram of an example method 700 of three-phase inverter control. Referring to FIG. 7 and with additional reference to FIGS. 3A and 4, the controller 104 can determine the three-phase AC $I_{ABC}$, e.g., using current sensors 530, at 702. At 704, the controller 104 can calculate a voltage vector based on $I_{ABC}$. At 706, the controller 104 can determine whether the voltage vector is located in region (1). If false, the controller 104 can proceed to 714. If true, the controller 104 can determine whether a magnitude of $I_A$ is greater than a magnitude of $I_C$, i.e., the two non-clamped phases for region (1), at 708, If true, the controller 104 can select zero-voltage vector $V_7$ at 710 and the method 700 can end. If false, the controller 104 can select zero-voltage vector $V_0$ at 712 and the method 700 can end.

At 714, the controller 104 can determine whether the voltage vector is located in region (2). If false, the controller 104 can proceed to 722. If true, the controller 104 can determine whether a magnitude of $I_B$ is greater than a magnitude of $I_C$, i.e., the two non-clamped phases for region (2), at 716. If true, the controller 104 can select zero-voltage vector $V_7$ at 718 and the method 700 can end. If false, the controller 104 can select zero-voltage vector $V_0$ at 720 and the method 700 can end. At 722, the controller 104 can determine whether the voltage vector is located in region (3). If false, the controller 104 can proceed to 730. If true, the controller 104 can determine whether a magnitude of $I_B$ is greater than a magnitude of $I_A$, i.e., the two non-clamped phases for region (3), at 724. If true, the controller 104 can select zero-voltage vector $V_7$ at 726 and the method 700 can end. If false, the controller 104 can select zero-voltage vector $V_0$ at 728 and the method 700 can end.

At 730, the controller 104 can determine whether the voltage vector is located in region (4). If false, the controller 104 can proceed to 738. If true, the controller 104 can determine whether a magnitude of $I_C$ is greater than a magnitude of $I_A$, i.e., the two non-clamped phases for region (4), at 732. If true, the controller 104 can select zero-voltage vector $V_7$ at 734 and the method 700 can end. If false, the controller 104 can select zero-voltage vector $V_0$ at 736 and the method 700 can end. At 738, the controller 104 can determine whether the voltage vector is located in region (5). If false, the controller 104 can proceed to 746. If true, the controller 104 can determine whether a magnitude of $I_C$ is greater than a magnitude of $I_B$, i.e., the two non-clamped phases for region (5), at 740. If true, the controller 104 can select zero-voltage vector $V_7$ at 742 and the method 700 can end. If false, the controller 104 can select zero-voltage vector $V_0$ at 744 and the method 700 can end.

At 746, the controller 104 can determine whether the voltage vector is located in region (6). If false, the method 700 can end. For example only, the controller 104 could set a fault or a flag to indicate an error because the voltage vector has been determined to be in none of the six regions (1)-(6). When true, however, the controller 104 can determine whether a magnitude of $I_A$ is greater than a magnitude of $I_B$, i.e., the two non-clamped phases for region (6), at 748. If true, the controller 104 can select zero-voltage vector $V_7$ at 750 and the method 700 can end. If false, the controller 104 can select zero-voltage vector $V_0$ at 752 and the method 700 can end. After reaching its end, the method 700 could then be repeated for one or more additional cycles.

Figure 8:
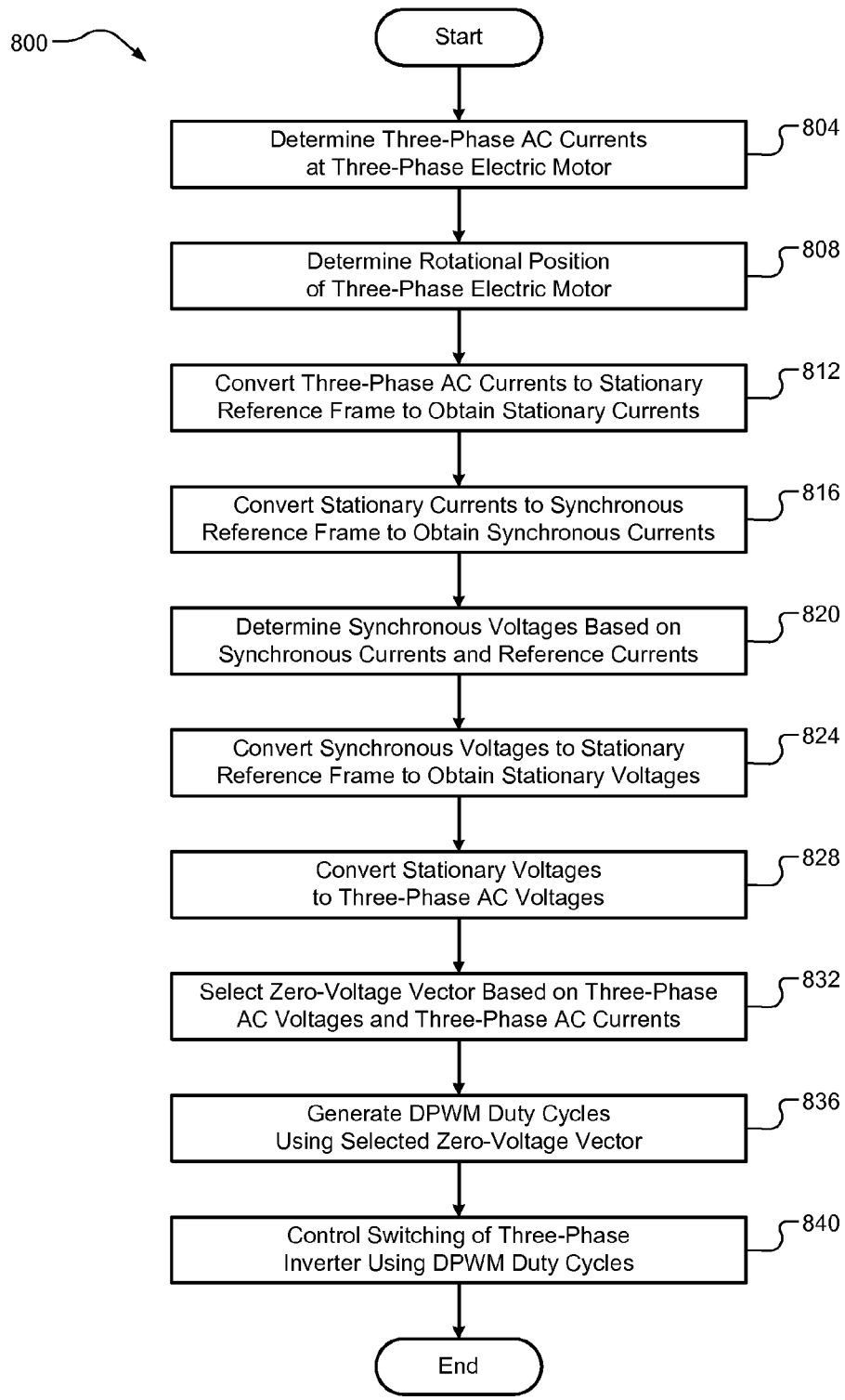
FIG. 8 is a flow diagram of another method of three-phase inverter control according to the principles of the present disclosure.

FIG. 8 is a flow diagram of another example method 800 of three-phase inverter control. At 804, the controller 104 can determine the three-phase AC currents at the three-phase electric motor 120, e.g., using current sensors 530. At 808, the controller 104 can determine the rotational position of the three-phase electric motor 120 (the rotational position of the rotor 524), e.g., using position sensor 520. At 812, the controller 104 can convert the three-phase AC currents to the stationary reference frame to obtain stationary currents. At 816, the controller 104 can convert the stationary currents to the synchronous reference frame (using the rotational position) to obtain the synchronous currents. At 820, the controller 104 can determine synchronous voltages based on the output of the current regulators 612.

At 824, the controller 104 can convert the synchronous voltages to the stationary reference frame (using the rotational position) to obtain stationary voltages. At 828, the controller 104 can convert the stationary voltages to three-phase AC voltages. At 832, the controller 104 can select one of two zero-voltage vectors for the three-phase inverter 128 based on the three-phase AC voltages, e.g., a voltage vector represented by the three-phase AC voltages, and the three-phase AC currents. At 836, the controller 104 can generate DPWM duty cycles using the selected zero-voltage vector. At 840, the controller 104 can control switching of the three-phase inverter 128 using the DPWM duty cycles. The method 800 can then end or return to 800 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
    determining, at a controller of an electrified vehicle (EV), the controller including one or more processors, three-phase AC currents at an electric motor of the EV, wherein the EV includes a three-phase inverter configured to convert a direct current (DC) from a battery system of the EV to the three-phase AC currents for the electric motor of the EV;
    sensing, at the controller via a position sensor, a rotational position of the electric motor;
    determining, at the controller, an output voltage vector based on the three-phase AC currents, reference currents, and the rotational position of the electric motor, wherein the reference currents are based on a torque request for the electric motor, a speed of the electric motor, and a DC voltage output by the battery system;
    selecting, at the controller, one of two zero-voltage vectors for the three-phase inverter based on the output voltage vector; and
    controlling, by the controller, switching of the three-phase inverter using the selected zero-voltage vector.

2. The method of claim 1, further comprising converting, at the controller, the three-phase AC currents to a stationary reference frame based on the rotational position of the electric motor to obtain stationary currents.

3. The method of claim 2, further comprising converting, at the controller, the stationary currents to a synchronous reference frame to obtain synchronous currents.

4. The method of claim 3, further comprising determining, at the controller, synchronous voltages based on the synchronous currents and the reference currents.

5. The method of claim 4, wherein determining the synchronous voltages based on the synchronous currents and the reference currents includes using current regulators.

6. The method of claim 4, further comprising converting, at the controller, the synchronous voltages to the stationary reference frame based on the rotational position of the electric motor to obtain stationary voltages.

7. The method of claim 6, further comprising converting, at the controller, the stationary voltages from the stationary reference frame to obtain three-phase AC voltages.

8. The method of claim 7, further comprising selecting, at the controller, the zero-voltage vector for the three-phase inverter based on the three-phase AC voltages.

9. The method of claim 8, wherein selecting the zero-voltage vector for the three-phase inverter based on the three-phase AC voltages further comprises determining, at the controller, the voltage vector based on the three-phase AC voltages.

10. The method of claim 9, wherein selecting the zero-voltage vector for the three-phase inverter based on the three-phase AC voltages further comprises identifying, at the controller, which one of a plurality of voltage vector regions includes the voltage vector.

11. The method of claim 10, wherein selecting the zero-voltage vector for the three-phase inverter based on the three-phase AC voltages further comprises determining, at the controller, magnitudes of currents for two phases associated with the identified voltage vector region.

12. The method of claim 11, wherein selecting the zero-voltage vector for the three-phase inverter based on the three-phase AC voltages further comprises selecting, at the controller, one of the two or more zero-voltage vectors associated with one of the two phases having a larger magnitude of current.

13. The method of claim 8, wherein controlling switching of the three-phase inverter using the zero-voltage vector further comprises generating, at the controller, discontinuous pulse-width modulation (DPWM) duty cycles for switching of the three-phase inverter based on the three-phase AC voltages and the selected zero-voltage vector.

14. The method of claim 13, wherein controlling switching of the three-phase inverter using the zero-voltage vector further comprises controlling, by the controller, the switching of the three-phase inverter using the DPWM duty cycles.

15. The method of claim 1, wherein the rotational position of the electric motor is a rotational position of a rotor of the electric motor.

16. A method, comprising:
    determining, at a controller of an electrified vehicle (EV), the controller including one or more processors, three-phase AC currents at an electric motor of the EV, wherein the EV includes a three-phase inverter configured to convert a direct current (DC) from a battery system of the EV to the three-phase AC currents for the electric motor of the EV;
    sensing, at the controller via a position sensor, a rotational position of a rotor of the electric motor;
    converting, at the controller, the three-phase AC currents to a stationary reference frame to obtain stationary currents;
    converting, at the controller, the stationary currents to a synchronous reference frame based on the rotational position of the rotor of the electric motor to obtain synchronous currents;
    determining, at the controller, synchronous voltages based on the synchronous currents and reference currents using current regulators, wherein the reference currents are based on a torque request for the electric motor, a speed of the electric motor, and a DC voltage of the battery system;
    converting, at the controller, the synchronous voltages to the stationary reference frame based on the rotational position of the rotor of the electric motor to obtain stationary voltages;
    converting, at the controller, the stationary voltages from the stationary reference frame to three-phase AC output voltages;
    selecting, at the controller, one of two zero-voltage vectors for the three-phase inverter based on the three-phase AC output voltages;
    generating, at the controller, discontinuous pulse-width modulation (DPWM) duty cycles based on the three-phase AC output voltages, the three-phase AC currents, and the selected zero-voltage vector; and
    controlling, by the controller, switching of the three-phase inverter using the DPWM duty cycles.

17. The method of claim 16, wherein selecting the one of the two zero-voltage vectors for the three-phase inverter based on the three-phase AC output voltages further comprises determining, at the controller, a voltage vector based on the three-phase AC output voltages.

18. The method of claim 17, wherein selecting the one of the two zero-voltage vectors for the three-phase inverter based on the three-phase AC output voltages further comprises identifying, at the controller, which one of a plurality of voltage vector regions includes the voltage vector.

19. The method of claim 18, wherein selecting the one of the two zero-voltage vectors for the three-phase inverter based on the three-phase AC output voltages further comprises determining, at the controller, magnitudes of currents for two phases associated with the identified voltage vector region.

20. The method of claim 19, wherein selecting the one of the two zero-voltage vectors for the three-phase inverter based on the three-phase AC output voltages further comprises selecting, at the controller, one of the two zero-voltage vectors associated with one of the two phases having a larger magnitude of current.

* * * * *